United States Patent [19]
Weed

[11] 3,756,643
[45] Sept. 4, 1973

[54] ENERGY-ABSORBING SAFETY APPARATUS

[76] Inventor: Oscar D. Weed, 355 Serrano Dr., Apt. 9-H, San Francisco, Calif. 94132

[22] Filed: Dec. 30, 1971

[21] Appl. No.: 214,113

Related U.S. Application Data

[63] Continuation-in-part of Ser. No. 108,344, Jan. 21, 1970, abandoned.

[52] U.S. Cl. .................................. 293/86, 267/139
[51] Int. Cl. ........................................... B60r 19/08
[58] Field of Search .................. 293/DIG. 2, 70, 85, 293/86, 89; 213/43; 267/34, 116, 139; 188/316

[56] References Cited
UNITED STATES PATENTS

| | | | |
|---|---|---|---|
| 3,537,598 | 11/1970 | Moody | 213/43 |
| 1,449,339 | 3/1923 | Malberti | 293/86 |

Primary Examiner—Gerald M. Forlenza
Assistant Examiner—Robert Saifer
Attorney—Paul D. Flehr, Elmer S. Albritton et al.

[57] ABSTRACT

Safety apparatus for absorbing the impact of shock forces upon a body structure, e.g. an automobile. A bumper is mounted at either end of the automobile. Hydraulic fluid shock absorbing means is interposed between the bumper and automobile. The shock absorbing means include at least one dashpot cylinder carrying a piston which is restricted in its movement by the action of hydraulic fluid being forced through throttling grooves formed in the cylinder. A piston rod carried on the piston extends from the cylinder in a direction remote from the bumper and is mounted to bracket arms for movement therewith. The piston rod is substantially enclosed by the cylinder in the ready position with the piston adjacent the head end of the cylinder. Shock forces acting on the bumper are absorbed as the bracket arms move the piston rod in tension to carry the piston toward the recoil position at the rod end of the cylinder. Resilient means is provided to both absorb a portion of the shock forces and return the elements to the ready position.

5 Claims, 5 Drawing Figures

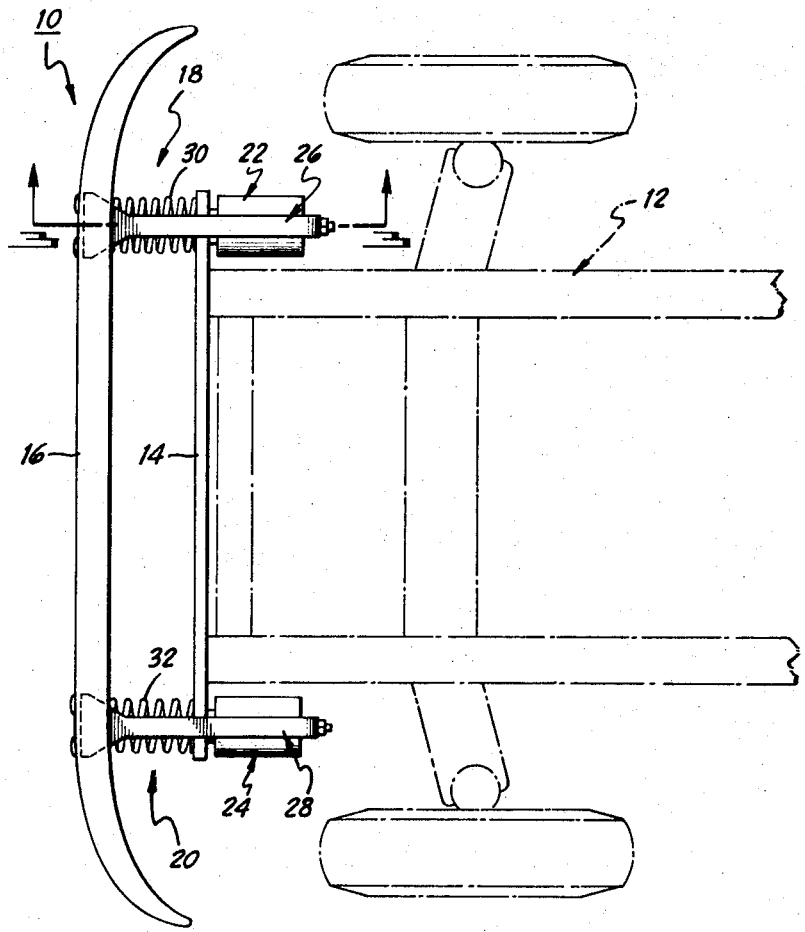
FIG_1
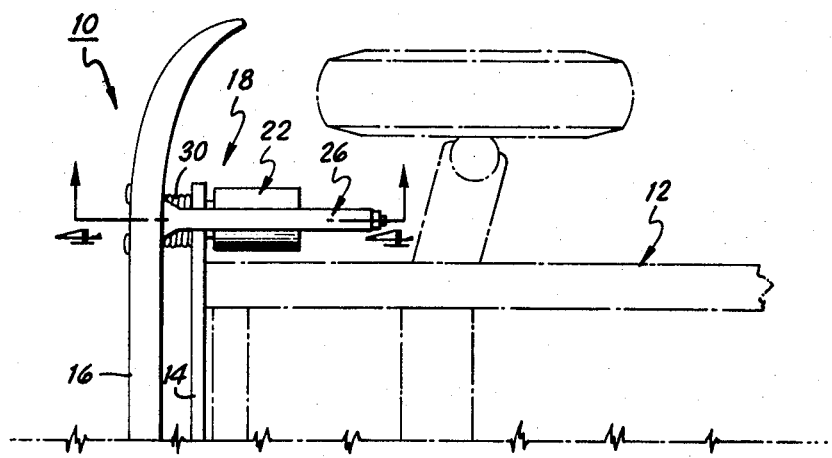
FIG_2

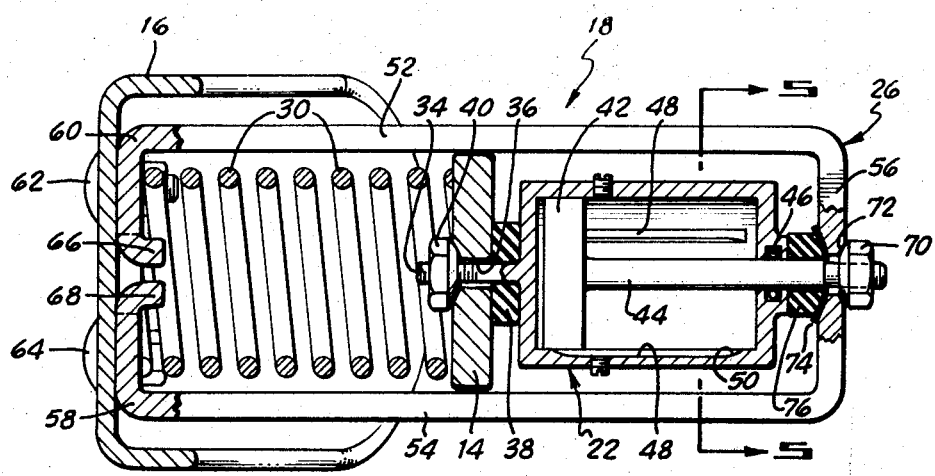
FIG_3
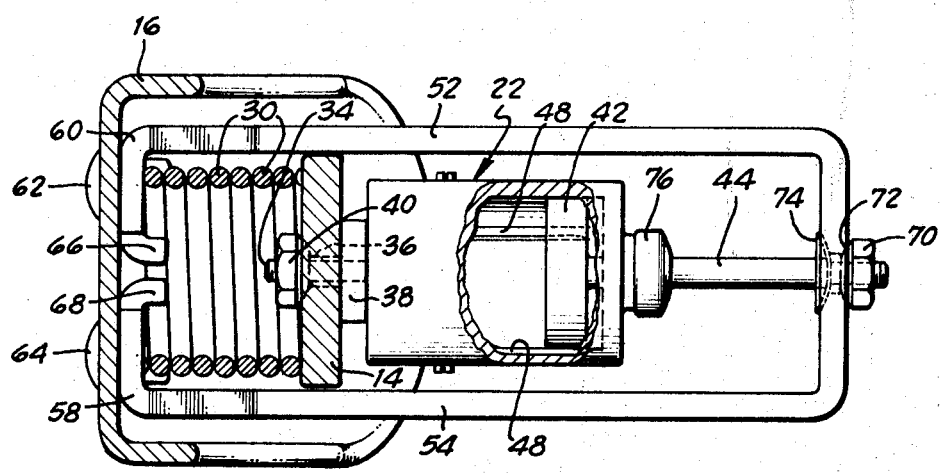
FIG_4
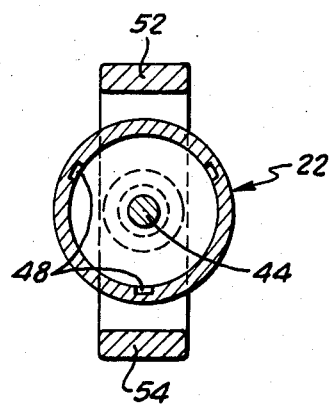
FIG_5

ENERGY-ABSORBING SAFETY APPARATUS

CROSS REFERENCE TO RELATED APPLICATION

This application is a continuation-in-part of copending application Ser. No. 108,344 filed Jan. 21, 1970 now abandoned.

BACKGROUND OF THE INVENTION

This invention relates in general to shock absorbing apparatus and in particular relates to apparatus for absorbing the shock forces impacting upon a body structure such as an automobile as a safety device for protecting both the occupants from injury and the vehicle from damage.

A number of devices have previously been proposed for use in absorbing the shock forces impacting upon body structures such as automobiles and the like. Among the prior designs are those in which coil springs and/or hydraulic dashpots are mounted between the frame and bumper of an automobile. The prior designs present a number of limitations and drawbacks and have not been widely accepted by either automobile manufacturers or by governmental authorities in establishing automobile safety standards. It is known that the use of coil springs alone is not effective in absorbing the severe forces in an end-on collision because they immediately return the absorbed energy into the system in counter-recoil action which often aggravates the damage to occupants or cargo. Thus designers have sought to provide other types of shock absorbing apparatus such as hydraulic dashpots interposed between the bumper and body strucutre. One conventional design is to provide a collapsable bumper having fluid filled compartments with restricted outlet ports such that upon impact the fluid is expelled at a controlled rate. However, this design requires that the compartments be refilled with fluid following impact, and the design furthermore is not adequate for absorbing the heavy forces received in a major collision. Additionally, in such a design the energy which is absorbed bears a relation to the area of impact. Consequently, little protection is afforded against collision with a structure such as a vertical post.

In previous designs which propose the use of hydraulic shock absorbers the extreme forces received in a major collision can cause gross misalignment of the bumper with respect to the vehicle, failure of the shock absorbing structure through binding of the moving elements, or buckling of the piston rods under compression forces, since the piston rod is initially at the rod end of the cylinder. Furthermore, prior art shock absorbers of this type are arranged such that the piston rods in the normal or ready position are exposed and subject to corrosion and damage over extended time periods, thereby rendering them increasingly subject to failure when in use. Additionally, known shock absorber designs have failed to provide means to adequately accommodate impact forces having substantial lateral or vertical components.

OBJECTS AND SUMMARY OF THE INVENTION

It is a general object of the invention to provide new and improved apparatus for absorbing shock forces impacting upon a body structure, such as an automobile.

Another object is to provide shock absorbing apparatus of the character described incorporating hydraulic cylinders interposed between the body structure and a bumper in which movement of the bumper to its recoil position upon impact acts to carry the pistons through the cylinders by forces acting on piston rods in tension rather than in compression.

Another object is to provide shock absorbing apparatus of the character described in which hydraulic cylinders interposed between the body structure and a bumper are connected through bracket members extending alongside the cylinders and connected to the piston rod with the latter carried substantially within and protected by the cylinder in the ready position of the elements.

Another object is to provide shock absorbing apparatus of the character described in which hydraulic cylinders are interposed between the body structure and a bumper in a manner affording limited articulation to accommodate impact forces having lateral or vertical components.

The invention comprises shock absorbing apparatus interposed between a body structure, such as an automobile, and one or more bumpers spaced from either end of the automobile. A plurality of hydraulic cylinders carried by the frame of the automobile include pistons adapted to be moved back and forth within the cylinder by piston rods which project from the cylinders in a direction remote from the bumper. Hydraulic fluid is confined within the cylinders with means to provide a controlled rate of flow between the head and rod ends of the cylinders for restricting movement of the pistons and thereby absorbing the energy of the shock forces. Bracket arms extending alongside the cylinders interconnect the piston rods for movement with the bumper. In the ready position of the elements the pistons are adjacent to the cylinder head ends. The pistons are carried through the shock absorbing stroke to their recoil positions at the cylinder rod ends as the shock forces impact upon the bumper. The force of collision is "spread" so that the sudden heavy shock is converted to a thrust exerted over appreciable distance approximating the piston stroke. Coil springs are interposed between the body structure and bumper to both absorb a portion of the impact forces and return the bumper and pistons slowly to the ready position against the damping effect of the hydraulic dashpots. Mounting means are provided to afford limited articulation between the cylinder head ends and a transverse structural member of the automobile, and between the cylinder rod ends and a vertical member extending between the distal ends of the bracket arms.

Additional objects and features of the invention will appear from the following description in which the preferred embodiment of the invention has been set forth in detail in conjunction with the drawing.

BRIEF DESCRIPTION OF THE DRAWING

FIG. 1 is a top plan view of shock absorber apparatus of the invention illustrated as mounted to the front end of an automobile chassis, shown in broken-line, and with the apparatus elements in ready position;

FIG. 2 is a fragmentary top plan view similar to FIG. 1 illustrating the elements in recoil position;

FIG. 3 is a longitudinal sectional view taken along the line 3—3 of FIG. 1;

FIG. 4 is a longitudinal sectional view taken along the line 4—4 of FIG. 2;

FIG. 5 is a cross-sectional view taken along the line 5—5 of FIG. 3.

DESCRIPTION OF THE PREFERRED EMBODIMENT

In the drawings FIG. 1 illustrates generally at 10 shock absorbing apparatus constructed according to the invention and specially adapted for use on a vehicle such as an automobile, of which a portion of the chassis is illustrated generally at 12. While the invention will be described in relation to the use on an automobile as safety apparatus for protecting both the occupants from injury and automobile from damage during a collision, it is understood that the invention will find further application in absorbing the shock forces impacting upon other types of body structure, e.g. as a cushioning device for a truck loading dock, as a barricade protecting a highway toll-gate house, as a railroad car bumper at the dead end of a spur track, or the like.

Shock absorber apparatus 10 is shown as mounted on the illustrated front end of the chassis, and a similar shock absorber apparatus, not shown, would be mounted at the chassis rear end. A transverse structural frame member 14 is provided at the chassis front end for carrying the elements of apparatus 10. Apparatus 10 includes a laterally extending high strength bumper 16 together with a pair of shock absorber assemblies 18, 20 interposed between the bumper and transverse frame member 14. While a pair of laterally spaced assemblies 18, 20 are illustrated as preferred, it is understood that the invention contemplates that additional shock absorber assemblies of the type described may be provided in spaced relationship depending upon particular design specifications and requirements. The invention further contemplates utilizing only one shock absorber assembly of the construction and operation as described herein.

The shock absorber assemblies 18, 20 include hydraulic dashpots or cylinders 22, 24, mounting bracket means 26, 28 and relatively heavy coil springs 30, 32. The springs function to absorb part of the shock of collision and return the assembly slowly to the ready position against the dampening effect of the hydraulic dashpot.

The construction and operation of the two shock absorber assemblies 18, 20 is identical and it will suffice to describe that for assembly 18, as best illustrated in FIGS. 3–5. The hydraulic cylinder 22 is mounted on the rearward side of transverse frame member 14 in axial alignment with the longitudinal axis of the vehicle. A mounting stud 34 secured as by welding to the head end of the cylinder projects with radial clearance through an opening 36 formed in member 14, and an annular spacer 38 of a suitable elastomeric material such as neoprene rubber is mounted around the stud between the cylinder and transverse member. A threaded nut 40 formed with a base surface of spherical configuration is turned onto the threaded end of the stud to lock the cylinder and spacer 38 against the transverse member. The base of the nut seats against a spherical countersunk portion formed around opening 36 thereby providing limited articulation of the cylinder with respect to transverse member 14 to afford some freedom of movement between the elements where shock forces have direction components that are lateral, vertical or a combination thereof. Relative movement between the end face of the cylinder and the transverse member is accommodated for by the yieldable nature of spacer 38, and yet the spacer permits the cylinder to be drawn into relatively rigid relationship for carrying the mounting brackets and bumper in the ready position.

Cylinder 22 carries a piston 42 for slidable movement between the head end position of FIG. 3 and the rod end position of FIG. 4. A piston rod 44 is carried on the piston and projects outwardly in a direction remote from the bumper through an opening formed in the rod end of the cylinder. Suitable sealing means 46 is provided to form a seal between the piston rod and cylinder for constraining hydraulic fluid within the cylinder. A plurality, shown as three, of throttling grooves 48 are formed on the inner surface of the cylinder and extend longitudinally thereof to provide flow channels for controlling the rate of fluid transfer between the cylinder ends during movement of the piston. The depth and/or width of the grooves is caused to vary in axial extent as by forming the ends of each groove with a bevel or slope at 50 to provide a variable rate of flow restriction. Thus, the throttling groove cross-sectional area progressively decreases near the head and rod ends of the cylinder so that the flow restriction, and therefore the cushioning or braking effect, progressively increases as the piston approaches either end of its stroke.

Piston rod 44 is constrained for movement with the bumper through mounting bracket means 26 comprising a generally U-shaped structure forming upper and lower bracket arms 52, 54 which project rearwardly across transverse frame member 14 and across diametrically opposed sides of the cylinder for connection with the distal end of the piston rod through vertical member 56. The forward ends of each of the two bracket arms are turned inwardly at 58 and 60 where they are mounted to the inside of the bumper through suitable fasteners such as the bolted connections 62, 64. The spring 30 is of coil spring construction seated at its inward end against transverse member 14 over nut 40 and at its outer end over rearwardly turned lips 66, 68 of the bracket arms. Spring 30 is mounted under some compression in the ready position of FIG. 3 providing a thrust force urging the bumper and shock absorber elements outwardly to prevent noise and rattling as the vehicle is operated.

Mounting bracket means 26 is connected to the distal end of piston rod 44 by means forming a joint of limited articulation and which includes a nut 70 having a base surface of spherical configuration. This nut is turned onto the threaded rod end of reduced diameter. The rod end projects through an opening 72 formed in the vertical member 56 of a diameter providing sufficient clearance around the rod end to accommodate a range of angular displacement. The outer side of opening 72 is formed with a countersink having a spherical surface against which nut 70 seats. The inner side of opening 72 is likewise formed with a countersink having a spherical surface against which the spherical surface of a retainer ring 72 is seated. Vertical member 56 of the bracket is thus seated against the piston rod through ring 74 which in turn is mounted against a shoulder at the base of the reduced rod end. The elements are locked in place when the nut 70 is turned down on the end of the rod. An annular member 76 of an elastomeric material such as neoprene rubber is mounted against the rod end of the cylinder around the piston rod to act as a cushioning stop for the bracket as the elements return to their ready position through the action of spring 30.

The use and operation of shock absorber apparatus 10 as mounted on the exemplary automobile chassis 12 is as follows. The elements of the apparatus are in their ready position of FIG. 3 with bumper 16 and mounting brackets 26 urged away from the vehicle by the force of coil springs 30, and this in turn positions pistons 42 adjacent the head ends of cylinder 22. The force of the springs 30 is sufficient to hold the elements in a relatively rigid position, with the upper bracket arms 52 resting upon transverse member 14 to assist in holding the bumper against the force of gravity. When an impact is received against the bumper such as in a collision the bracket arms 52, 54 are moved rearwardly with respect to the vehicle to carry the pistons 42 toward their recoil position. Movement of the pistons is resisted as hydraulic fluid in the rod ends of the cylinders is forced at a controlled rate through the throttling grooves 48 into the cylinder head ends. The combined cross sectional areas of the throttling grooves control this flow so that the energy of the shock forces is absorbed in the two cylinders substantially within the length of piston stroke. As the pistons near the rod ends the resisting force is caused to progressively increase as the edges of the pistons move over the decreasing cross sectional areas of the bevel portions 50. In addition, a portion of the shock forces is absorbed as spring 30 is compressed. Following absorption of the shock forces the elements are in the recoil position of FIG. 4 with piston 42 adjacent the rod end of the cylinder. The compression force of springs 30 then urges the bumper and bracket arms outwardly from the vehicle to return the elements slowly to their ready position, against the dampening effect of the hydraulic dashpots. This return action is restricted by the controlled flow of fluid from the cylinder head ends through the throttling grooves and into the rod ends with the resistance progressively increasing as the piston moves over the bevel portions of the grooves at the head ends.

It will be readily seen from FIG. 3 that with the shock absorber assembly elements in the ready position the piston rod 44 is substantially enclosed within cylinder 22 where it is protected from corrosion and damage. Ths piston rod thus is protected throughout extended periods of vehicle use to ensure that it functions properly during the relatively infrequent periods of use in absorbing shock forces.

It will further be seen that when the shock absorber apparatus is brought into operation the bracket arms are effective to pull the pistons through their working strokes by tension forces acting on the piston rods, thereby obviating the tendency which would otherwise occur for the cylinder elements to bind during the working stroke and further obviating failure of the piston rod due to bending or buckling in compression. Instead the compression forces acting against each shock absorber assembly are distributed over the two bracket arms 52, 54 of high strength construction. The invention further provides self-centering ability for each of the shock absorber units to effectively receive and absorb forces which may be out of longitudinal alignment with the vehicle without resulting in failure or binding of the elements during movement towards the recoil position, while at the same time maintaining substantial rigidity of the elements in the ready position to hold the bumper in proper alignment. This is accomplished in the invention through the provision of the limited articulated joints which connect the cylinder head ends and piston rods with the transverse member and bracket arms in a parallelogram linkage of limited movement. The provision of the elastomeric spacers 38, 76 between the cylinder, bracket and frame member permits the elements to be tightly connected and yet allows a degree of play between the elements to accommodate limited articulation at the joints provided at the spherical surfaces of locking nuts 40, 70, and retainer ring 74.

While the foregoing embodiment is at present considered to be preferred it is understood that numerous variations and modifications may be made therein by those skilled in the art and it is intended to cover in the appended claims all such variations and modifications as fall within the true spirit and scope of the invention.

I claim:

1. In apparatus for absorbing shock forces impacting upon a body structure, the combination of a bumper positioned at one end of the body structure, bracket means secured to said bumper and extending toward said body structure, said bracket means including bracket arms adapted to carry said bumper between a ready position normally extended outwardly from said body structure and a recoil position displaced towards said body structure following impact of said shock forces upon the bumper, resilient means mounted between said body structure and bumper and adapted to yieldably urge said bumper to said ready position, and hydraulic fluid shock absorbing means including cylinder means carried by said body structure and having a head end and a rod end, piston means mounted for movement within said cylinder means, hydraulic fluid confined within said cylinder means to restrict said movement of said piston means, and piston rod means interconnecting said piston means with said bracket arms, said piston rod means including a rod distal end projecting through the rod end of said cylinder means in a direction remote from said bumper, said piston means being disposed adjacent said head end with said bumper in said ready position and said piston means being disposed adjacent said rod end with the bumper in said recoil position, first articulated joint means interconnecting said rod distal end for movement with said bracket arms, and second articulated joint means interconnecting said cylinder means with said body structure whereby impact forces having direction components oblique to the longitudinal axis of the body structure are absorbed while said first and second joint means undergo articulation to substantially maintain alignment of said piston rod means within said cylinder means.

2. Apparatus as in claim 1 in which said body structure comprises a vehicle, said bumper is positioned to extend laterally across one end of said vehicle, and said cylinder means comprises a plurality of cylinders transversely spaced-apart and carried at said one end of the vehicle, said piston means including a piston mounted for movement within each cylinder and said bracket means comprises laterally spaced-apart pairs of said bracket arms extending between said bumper and the distal ends of said piston rod means.

3. Apparatus as in claim 2 in which said bracket arms of each of said arm pairs project along diametrically opposed lateral sides of respective cylinders.

4. Apparatus as in claim 2 in which said shock absorbing means includes means to direct a restricted flow of said hydraulic fluid between the head and rod ends of said cylinder means during movement of said piston means therein.

5. In apparatus for absorbing shock forces impacting upon a vehicle having a frame member adjacent one end thereof, the combination of a bumper positioned at one end of and extending laterally across said vehicle, bracket means secured to said bumper and extending toward said vehicle, said bracket means including bracket arms adapted to carry said bumper between a ready position normally extended outwardly from said vehicle and a recoil position displaced toward said vehicle following impect of said shock forces upon the bumper, resilient spring means mounted between said vehicle and bumper and adapted to yieldably urge said bumper to said ready position, and hydraulic fluid shock absorbing means including cylinder means carried by said vehicle, said cylinder means comprising a plurality of cylinders each having a head end and a rod end and being carried by said vehicle, piston means mounted for movement within said cylinder means, said piston means including a piston mounted for movement within each cylinder and piston rod means interconnecting said pistons with said bracket arms, said piston rod means including rod distal ends projecting through the rod end of said cylinders in a direction remote from said bumper, hydraulic fluid confined within said cylinders to restrict the movement of said pistons, said bracket means comprising laterally spaced-apart pairs of said bracket arms extending between said bumper and the distal ends of said piston rod means, together with means interconnecting said rod distal ends for movement with said bracket arms, said pistons being disposed adjacent said cylinder head ends with said bumper in said ready position and disposed adjacent said cylinder rod ends with the bumper in said recoil position, and resilient spacer means mounted on said frame member on a side thereof remote from said bumper, said cylinder means being mounted on said resilient spacer means to afford limited angular movement of the cylinder with respect to the frame member.

* * * * *